April 19, 1960   J. M. AMBROSE   2,933,041
ROCKET GRAIN
Filed April 12, 1954
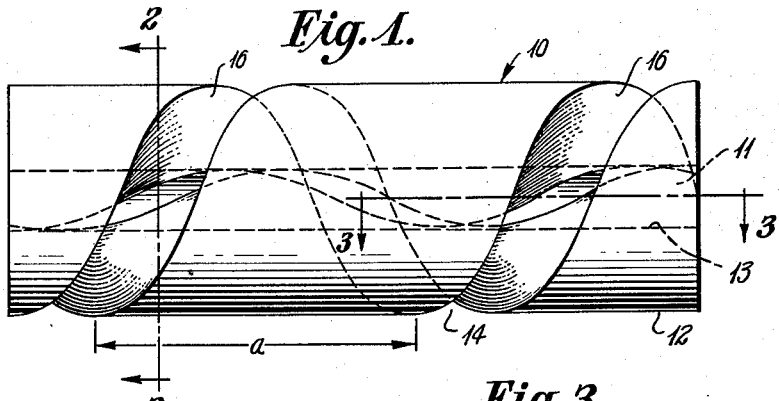
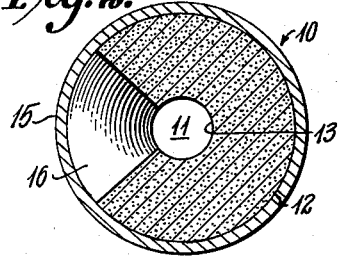
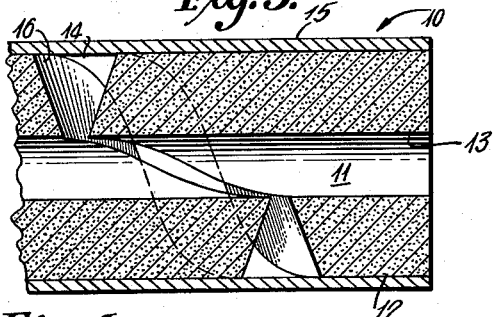
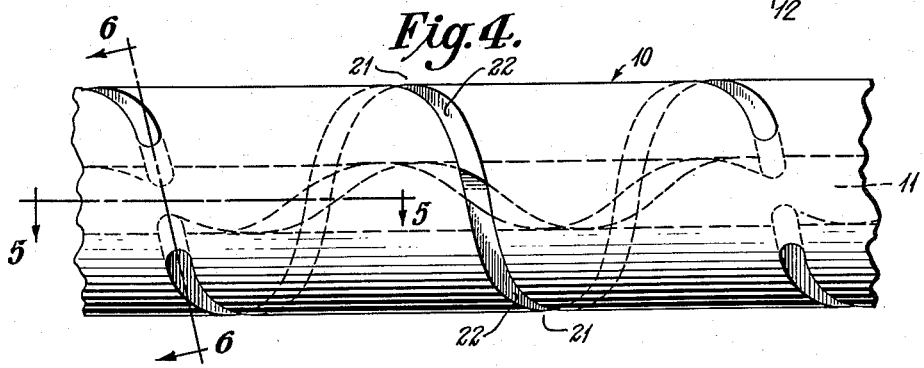
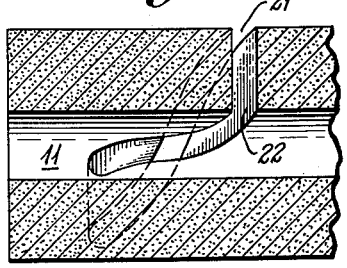
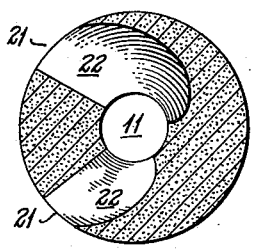
INVENTOR.
J. M. Ambrose
BY
Hudson and Young
ATTORNEYS United States Patent Office 2,933,041
Patented Apr. 19, 1960

2,933,041
ROCKET GRAIN

James M. Ambrose, McGregor, Tex., assignor to Phillips Petroleum Company, a corporation of Delaware Application April 12, 1954, Serial No. 422,285

4 Claims. (Cl. 102—98)

This invention relates to rocket grains. In a further aspect, this invention relates to a particular rocket grain having a combination of restricted and unrestricted surfaces. In a further aspect, this invention relates to a rocket grain stable to thermal cycling. In a further aspect, this invention relates to a method of forming rocket grains.

Rocket grains formed of solid propellant material have been made in a variety of shapes in order to provide different burning characteristics. Some of the surfaces of such rocket grains may be restricted in order to control the burning characteristics. Such restriction determines the burning time and the magnitude of the thrust obtained from such grains.

Each of the following objects of this invention is obtained by at least one of the aspects of this invention.

An object of this invention is to provide an improved rocket grain.

A further object of this invention is to provide a rocket grain stable to thermal cycling and which has no point of stress concentration during forming and use.

A further object of this invention is to provide a single grain which has the advantages of the multiple disc design.

A further object of this invention is to provide a method for the production of this improved rocket grain.

Other objects and advantages will be apparent to one skilled in the art upon reading the specification and study of the drawing accompanying and forming a part of this disclosure which comprises:

Figure 1, a side elevation of a grain according to this invention;

Figure 2, a cross-section view on line 2—2 of Figure 1;

Figure 3, a cross-section view on line 3—3 of Figure 1;

Figure 4, a side elevation of a grain formed according to a modification of my invention;

Figure 5, a cross-section view on line 5—5 of Figure 4, and

Figure 6, a cross-section view on line 6—6 of Figure 4.

According to my invention, a rocket grain having reduced stress concentration during forming or thermal cycling comprises a grain having a longitudinal perforation along the center of gravity of a cross-section of the grain and a slot located along a spiral encircling said center of gravity. Preferably the grain comprises a cylinder having a longitudinally extending perforation, the axis of which is common to the axis of the cylinder, and a slot in said cylinder extending spirally lengthwise of this cylinder. This slot may be continuous or interrupted. The slots extend from the outer surface of the grain to the perforation and all of the surfaces are restricted except those formed by this spiral slot. The distance between corresponding portions of the slot determines the web thickness and this web thickness determines the duration of the burning of the grain. In the preferred modification, the web thickness is between 1 and 3 times the diameter of the grain. Such grains are composed of a binder, such as rubber or asphalt, having a solid oxidant incorporated therein.

The invention also relates to a method of forming these grains, this comprising forming the perforated grain by extrusion or injection molding, or cutting or drilling the longitudinally extending perforation from a solid grain, and then cutting the groove therein.

Now referring to Figure 1, a preferred form of the rocket grain 10 is shown. This grain has a single longitudinally extending perforation 11, the axis of this perforation being common with the axis of the cylinder. Obviously the grain can be square, hexagonal or other shape in cross-section. The outer surface 12 and the inner surface 13 are both restricted. A grain of this structure is then cut to provide a spirally extending slot 14, this slot extending from the outer surface 12 to the inner surface 13. The web, shown as distance "a," is the distance between successive slots. This web should be between 1 and 3 times the diameter of the grain in order to provide the greatest stability.

Figures 2 and 3, being sectional views as set forth above, illustrate more fully the shape of this grain, the same reference numerals being used throughout. These figures show the rocket case 15. Since surfaces 12 and 13 are restricted, the burning takes place on the surface 16 which is formed by the slot.

Figure 4 shows a modification of this invention wherein a much narrower slot 21 is used, this providing slot surface 22 on which burning takes place.

These grains can be produced in various ways, a common method being to extrude the propellant material, this providing the longitudinally extending perforation in the grain. Another method is to mold the material in a stationary mold to provide the desired structure. Yet another method is to form a solid grain and to drill out the central perforation.

Following forming of the grain, it is fully restricted and the spiral slot is then formed. This is done by sawing, grinding, or machining away material to leave the slot.

In operation, the grain is placed within the rocket casing and ignited by suitable means. Since the surfaces 12 and 13 are restricted, all of the burning takes place along the surface forming the slot. The grain of this invention thus provides uniform burning surface and, since the length of the web is of limited size, excessive thermal strains do not develop. The single central hole or perforation is necessary, since this provides a center of communication for all of the burning surfaces and, therefore, provides the advantage of pressure equalization that would not be obtained if a plurality of perforations were present. Furthermore, flow of the gases through the central perforation provides less pressure drop than would be present if the gases were forced to flow through the spirally extending groove or through a plurality of longitudinally extending perforations.

The rocket grain, shown in Figure 1 where the slot extends throughout the length of the grain, is regressive to a limited extent during burning. This may be compensated for by starting this slot a little way in from the end of the grain or by leaving a portion of the slot uncut in the inner portion of the grain. Such a modification is shown in Figure 4, where the slots extend for a portion of the length of the grain and then a portion is left uncut. It will be obvious that a portion could be left at the end of the grain as well as a portion within the grain.

Rocket grains formed according to the process of this invention do not encounter the severe stresses brought about by temperature changes during use. In use, a grain may increase its dimensions by several percent in going from its low service temperature to its high service temperature. The steel case within which is mounted the grain undergoes a much smaller expansion and this sets up severe strains in the grain. By providing the grain with slots, as shown herein, there strains can be absorbed without creating points of high stress concentration.

As many possible embodiments may be made of this invention without departing from the cope thereof, it is to be understood that all matter herein set forth or shown in the accompanying drawings is to be interpreted as illustrative and not as unduly limiting the invention.

I claim:

1. A rocket assembly comprising a metal case and positioned therein, a cylindrical rocket grain stable to thermal cycling, said grain being provided with a single longitudinally extending axial perforation of substantial diameter in comparison with the diameter of the grain, a slot in said grain extending spirally lengthwise of said grain such that the web thickness is at least equal to the diameter of the grain, said slot extending from the outer surface of the grain to said perforation, and means restricting all surfaces of said grain except those formed by said slot, said rocket grain being longitudinally expandable.

2. The assembly of claim 1 in which the web thickness of the grain is between 1 and 3 times the diameter of said grain.

3. The assembly of claim 1 in which said slot is continuous from one end of the grain to the other.

4. The assembly of claim 1 in which said slot is interrupted.

References Cited in the file of this patent

UNITED STATES PATENTS

| | | |
|---|---|---|
| 660,567 | Gathmann | Oct. 30, 1900 |
| 660,568 | Gathmann | Oct. 30, 1900 |
| 2,575,871 | Gordon et al. | Nov. 20, 1951 |
| 2,661,692 | Vegren | Dec. 8, 1952 |
| 2,628,561 | Sage et al. | Feb. 17, 1953 |
| 2,780,997 | Baker | Feb. 12, 1957 |